(No Model.)

W. CLOW.
FISH SCALER.

No. 481,104.  Patented Aug. 16, 1892.

Witnesses.
Lewis P. Abell.
A. B. Monkhouse

Inventor.
William Clow.
by
Fetherstonhaugh & Co.
Attys.

UNITED STATES PATENT OFFICE.

WILLIAM CLOW, OF TORONTO, CANADA, ASSIGNOR OF THREE-FOURTHS TO WESLEY GEORGE REED, GEORGE CLOW, AND JAMES MUNROE SINCLAIR, OF SAME PLACE.

FISH-SCALER.

SPECIFICATION forming part of Letters Patent No. 481,104, dated August 16, 1892.

Application filed April 27, 1891. Serial No. 390,621. (No model.)

*To all whom it may concern:*

Be it known that I, WILLIAM CLOW, of the city of Toronto, in the county of York, in the Province of Ontario, Canada, have invented a certain new and useful Combined Fish Scaler and Holder, of which the following is a specification.

The object of the invention is to design a simple and effective means by which a fish can be easily and completely scaled and held during the process of such scaling without any danger of soiling the hands or fingers; and it consists, essentially, of a fish-scaler comprised of the serrated blade secured in lugs extending from a broad cross-bar forming the lower end of the handle of the scaler, the upper end of the handle having a socket made in it to receive the spring blade-holder, as hereinafter more particularly explained.

Figure 1:
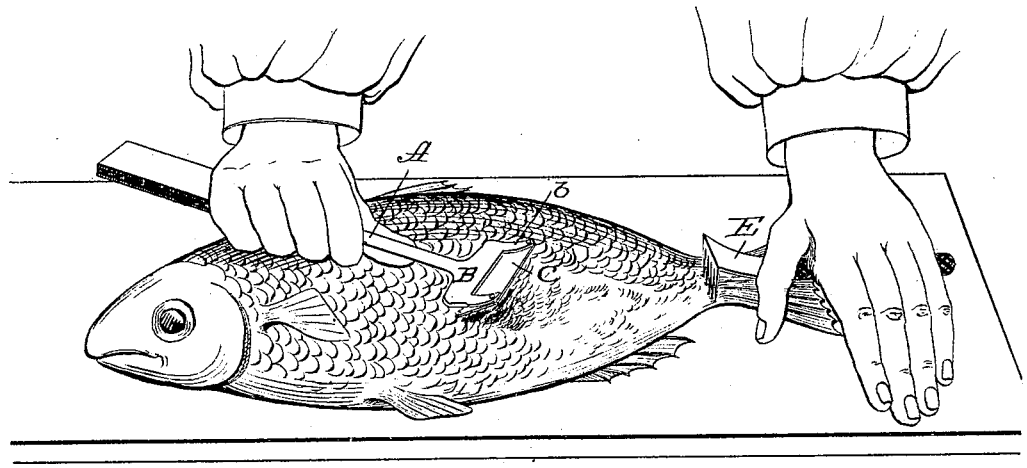
Figure 2:
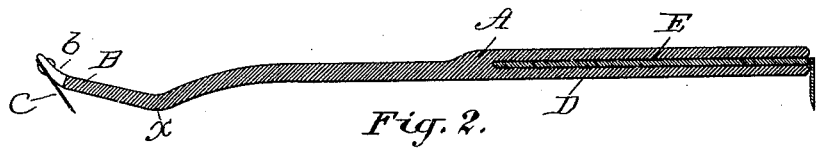
Figure 3:
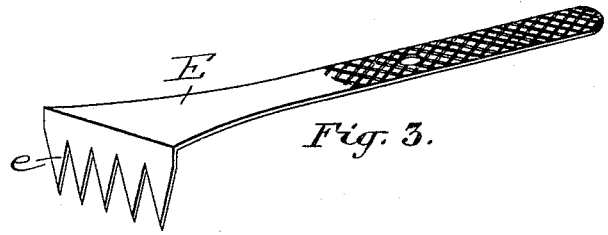
Figure 4:
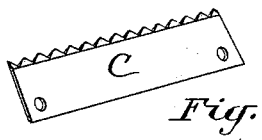

Figure 1 is a perspective view showing my combined scaler and holder applied in scaling a fish. Fig. 2 is a longitudinal section through the scaler and holder. Fig. 3 is a detail of the holder. Fig. 4 is a detail of the blade.

In the drawings like letters of reference indicate corresponding parts in each figure.

A is the handle, B the cross-bar, and *b* lugs extending from the cross-bar, and C the scaling-blade, which has a bevel-sharpened serrated edge, as shown, and is riveted at an acute angle to the lugs *b*.

D is a socket made in the handle A and designed to receive the holder E, which is preferably made of a piece of spring-steel with a turned-down serrated end, the long teeth *e* of which are designed to be driven into the tail of the fish to hold it when it is being scaled. The other end of the spring-holder is knurled, as shown, in order to enable the hand to securely retain the holder in position.

When scaling the fish, I first press the teeth *e* through the tail and then place one hand upon the knurled end of the holder, which I then press down and securely hold in position on the table or board on which I am scaling the fish. The other hand I use to operate the scaler.

It will be seen that I make the cross-bar B broad and locate it above the blade, so that the scales thrown up from the blade will be effectually kept from flying in all directions. It will be noticed that the shank in rear of the bar B bends downwardly to the point *x*, Fig. 2, thus furnishing a rounded bearing-point, from which point the bar B extends up at an angle and carries at the front end the scraper-blade, extending rearwardly at an angle of about forty-five degrees. This point forms a fulcrum, and in using the device the point may be made to bear on the fish, and by tilting the handle up or down the amount of pressure at the scraper-blade may be regulated. Thus by moving the handle downward while the rounded point is in contact will cause the blade to bear with any desired degree of lightness, and thus the tenderest and most delicate fish or other article may be scraped without danger of injuring the same.

I might make a hole in the holder E, as shown in Fig. 3, and have the same fit over a nail or hook when scaling the fish; but I find that that is really not necessary for properly securing the fish in position.

When I have finished scaling, I insert the holder E in the socket D and the combined instrument may be put away in any convenient place ready for use again.

The broad cross-bar is a flat continuation of the handle, and it will be seen that the device can be simply and inexpensively made by stamping the forward end of the device from the body of a flat piece of material, forming at the same time the projections *b*. The projections are bent upwardly to get the proper angle for the blade when secured thereto.

I am aware that it is not new to provide a corn-sheller with a handle and pronged end, the ends of the prongs curving downwardly and forming a bearing for a serrated blade, and I do not claim so broadly as to include such a device, my invention being limited to the handle having a pronged end, with the prongs extending upwardly and the blade secured to said prongs, but extending in the opposite direction—namely, downwardly and rearwardly.

What I claim as my invention is—

A scraper comprising a handle, a bar B at the forward end carrying an inclined scraper-blade, the shank of the handle and the said bar B inclining downwardly and meeting in a rounded bearing-point $x$ in the rear of the scraper-blade, substantially as described.

WILLIAM CLOW.

Witnesses:
L. P. ABELL,
WARREN BARR.